(12) United States Patent
Murdock

(10) Patent No.: US 10,641,226 B1
(45) Date of Patent: May 5, 2020

(54) REMOTE GENERATOR CONTROLLER SYSTEM AND DEVICES

(71) Applicant: Wheeler Machinery Co., Salt Lake City, UT (US)

(72) Inventor: Scott Murdock, Salt Lake City, UT (US)

(73) Assignee: Wheeler Machinery Co., Salt Lake City, UT (US)

( * ) Notice: Subject to any disclaimer, the term of this patent is extended or adjusted under 35 U.S.C. 154(b) by 0 days.

(21) Appl. No.: 16/047,886

(22) Filed: Jul. 27, 2018

(51) Int. Cl.
| | |
|---|---|
| *F02N 11/08* | (2006.01) |
| *F02D 41/04* | (2006.01) |
| *F02D 41/20* | (2006.01) |
| *F02D 41/22* | (2006.01) |
| *G01D 7/02* | (2006.01) |

(52) U.S. Cl.
CPC ........ *F02N 11/0807* (2013.01); *F02D 41/042* (2013.01); *F02D 41/20* (2013.01); *F02D 41/22* (2013.01); *G01D 7/02* (2013.01)

(58) Field of Classification Search
CPC .... F02N 11/08; F02N 11/0807; F02D 41/042; F02D 41/20; F02D 41/22; G01D 7/02
See application file for complete search history.

(56) References Cited

U.S. PATENT DOCUMENTS

| | | | |
|---|---|---|---|
| 6,055,163 A | 4/2000 | Wagner et al. | |
| 7,444,561 B2 * | 10/2008 | Korkishko | G06F 11/08 |
| | | | 714/718 |
| 10,008,965 B2 * | 6/2018 | Priem | H02P 9/04 |
| 2011/0163606 A1 | 7/2011 | Kumar et al. | |
| 2012/0053884 A1 | 3/2012 | Batzler et al. | |
| 2013/0116840 A1 | 5/2013 | Mauk et al. | |
| 2013/0214602 A1 | 8/2013 | Frohman et al. | |
| 2015/0008740 A1 | 1/2015 | Batzler et al. | |
| 2017/0130676 A1 | 5/2017 | Markoski et al. | |

\* cited by examiner

*Primary Examiner* — Hieu T Vo
(74) *Attorney, Agent, or Firm* — Travis R. Banta; TechLaw Ventures, PLLC

(57) ABSTRACT

A system is disclosed which includes a remote generator interface controller and a generator interface device. The generator interface device receives generator operation information and transmits the generator operation information to the remote generator interface controller. The remote generator controller device includes a processor, a screen, and a wireless receiver connected wirelessly to receive generator operation information from the generator interface device connected to a generator. The generator interface device includes a processor connected to a generator which receives generator operation information from at least one of a generator computer and a generator sensor and a transmitter connected wirelessly to transmit the generator operation information wirelessly from the generator interface device to the remote generator controller device.

20 Claims, 8 Drawing Sheets

REMOTE GENERATOR CONTROLLER SYSTEM AND DEVICES

BACKGROUND

1. Technical Field

This disclosure relates generally to a system for transmitting generator operation information to a monitoring location for processing and monitoring the data. More specifically, the system disclosed herein may both transmit and receive information representative of generator operation information from a generator controller and receive information at a control center to provide generator operation information to a remote user. The system may include one or more devices which facilitate transmitting generator operation information from a generator and receiving the generator operation information at a control center.

2. Description of the Related Art

Throughout history, the spread of access to electricity has changed the way humans live faster and more drastically than virtually any other discovery arguably since man mastered the use of fire. So great was the demand for electricity, that dams were built in previously unthinkable places to power electrical turbines to produce electricity. Electrical wires were soon strung or buried across virtually every continent. Even so, electrical power from an electrical grid is still not available everywhere it is desired.

Today, electrical power is still not available in remote locations, where quarries, mines, logging, cement plants, ranches, farms, and other similar activities take place. Further, even if electrical power is available, it is not available in high enough amperages to power electrically powered equipment associated with quarries, mines, logging, cement plants, ranches, farms, and other similar activities take place. Due to the desire for electricity in remote locations, fuel based electrical generators were developed to generate electricity from fuel.

Today, diesel fuel generators are ubiquitous in remote locations. That is electrical generators have been developed with internal fuel tanks that operate a fuel based engine to create the necessary rotation to generate electricity via an alternator, or similar device. Diesel fuel has been determined to be a cost efficient way of generating electrical power in generators because diesel engines tend to have a significant serviceable lifespan, diesel fuel is readily available, and the ratio of electricity produced to fuel consumed is relatively lower for diesel fuel than for other types of fuels.

Thus, generators, particularly diesel generators, have become the backbone of many remote locations providing electricity for not only the equipment necessary to perform a particular job, but also for the workers to have light in their shelters, cook their food, and run pumps that provide drinking water. Unfortunately, diesel generators, as reliable as they are, sometimes fail, often at inopportune times. Further, due to the remoteness of the locations where diesel generators are frequently used, obtaining new parts, and finding a technician to install them can be a long, time consuming, and expensive process. Also, many of the breakdowns that do occur in generators could have been prevented if someone knew that a potential problem was developing.

Conventional maintenance for fuel based generators is performed on an "engine hours" basis. That is, for every so many hours of operation the generator (engine hours), certain maintenance must be performed. For example, a manufacturer may suggest replacing a generator air filter every 100 engine hours to ensure that the generator has adequate air flow to facilitate chemical combustion in the engine. In some circumstances, a technician may be able to use an OBD II scanner to connect to a generator and obtain coded information about engine operation. Some late model generators include gauges which provide information about the motor and electrical output of the generator. However, obtaining coded information through an OBD II scanner or from the generator itself is largely impractical for a variety of reasons. First, information retrieved from an OBD II scanner is coded and must be decoded to be interpreted, which takes significant time and cost. Second, it is impractical for a technician to visually monitor the gauges on the generator during use. Many generators are run twenty four hours a day, seven days a week for months at a time, only shutting down for routine maintenance or occasional refueling. Moreover, many generators are placed at a location that is relatively distant from other machines to reduce exposure to dust and to reduce noise in a certain locality. It is equally impractical for a technician to travel from one generator to the next constantly on a site to determine if any of the gauges or the OBD II scanner reveals that the generator is about to malfunction.

Finally, when generators fail without warning, operators experience high costs in downtime. For example, in a cement plant, various generators may provide electrical power to conveyor belts which move rocks of a larger size into rock crushers to create successively smaller rocks for use in concrete. However, when one generator fails, one of the conveyor belts may lose electrical power and also fail. However, since other generators are still operating, a previous conveyor belt or a rock crusher may still be depositing rocks into a hopper of the disabled conveyor belt. This accumulation of rocks may prevent the conveyor belt from restarting because of the weight of the rocks in the hopper. In other words, the conveyor belt may be jammed due to excessive weight on the conveyor belt. Even if the generator requires only a simple fix which can be performed in mere minutes, it may take hours to manually unload the hopper on the generator. An entire production line may be shut down for a day, or longer, because a generator unexpectedly failed. Tens of thousands, hundreds of thousands, or even millions of dollars, in some cases, can be lost because of a generator failure.

It is therefore one object of this disclosure to provide an interface and transmitter device which may receive generator operation information from a generator and transmit the generator operation information to a control device. It is another object of this disclosure to provide a receiver device which receives generator operation information from the interface and transmitter device. It is another object of this disclosure to provide a control device which processes generator operation information received by the receiver device and communicated to the control device. It is a further object of this disclosure to provide the processed generator operation information on a display for user monitoring and interaction.

SUMMARY

Disclosed herein is a system is disclosed which includes a remote generator interface controller and a generator interface device. The generator interface device receives generator operation information and transmits the generator operation information to the remote generator interface controller.

Further disclosed herein is a remote generator controller device. The remote generator controller device includes a processor, a screen, and a wireless receiver connected wirelessly to receive generator operation information from the generator interface device connected to a generator.

Also disclosed herein is a generator interface device. The generator interface device includes a processor connected to a generator which receives generator operation information from at least one of a generator computer and a generator sensor and a transmitter connected wirelessly to transmit the generator operation information wirelessly from the generator interface device to the remote generator controller device.

BRIEF DESCRIPTION OF THE DRAWINGS

The accompanying drawings illustrate various embodiments of the remote generator dashboard system and devices.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
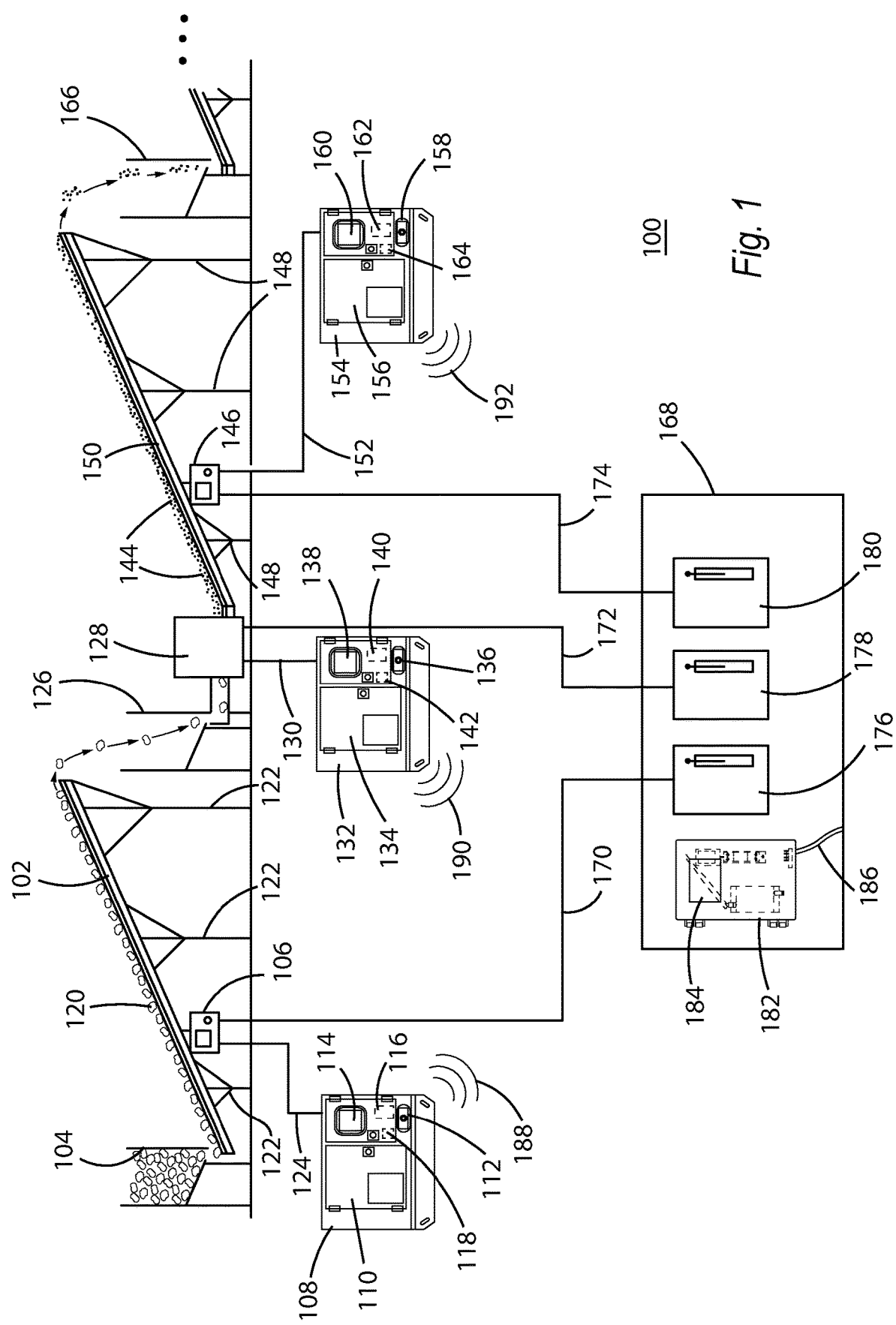
FIG. 1 illustrates an exemplary implementation of a remote generator dashboard system operating in an exemplary cement plant environment.

FIG. 1 illustrates an exemplary implementation of a remote generator dashboard system 100 operating in an exemplary cement plant environment. A cement plant may include, for example, a first conveyor belt 102 which includes a hopper 104 for receiving rocks 120 of a first size. Conveyor belt 102 may include a conveyor control device 106 which may control various functionalities of the conveyor belt, e.g., belt speed, on/off, etc. Conveyor belt 102 is typically operates using electricity provided by generator 108.

Generator 108 may generate electricity by converting chemical fuel into electricity by, for example, a diesel motor stored in compartment 110. Generator 108 may provide an emergency shutoff button 112 and may include one or more interface elements 114 which allow a user to control various functionalities of the generator. Generator 108 may include an interface device 116 which may retrieve generator operation information from generator 108 and a transmitter device 118 which transmits the generator operation information from generator 108 to a remote generator controller device, which will be discussed below.

Interface device 116 may be connected to generator 108 using any suitable connection. Interface device 116 may obtain generator operation information from generator 108 that includes information such as operational status (on/off), engine hours, average rotations per minute of a motor, current rotations per minute of a motor, electrical output frequency, generator load, average output voltage, fuel pressure, fuel storage level, coolant temperature, oil pressure, oil level, battery voltage, current output, motor temperature, airflow, and any other information that may be relevant to operation of generator 108. Interface device 116 may provide the generator operation information to transmitter device 118 which may transmit the generator operation information from generator 108 to a remote generator device, as will be discussed below.

As conveyor belt 102 receives electricity generated by generator 108, via electrical connection 124, conveyor belt 102 carries rocks 120 of a first size up the conveyor 102 by successively higher supports 122. It is noted that conveyor 102 may simply carry rocks of a first size 120 from one location to another without raising the level of conveyor 102 by successively higher supports 122. Conveyor 102 may be flat or angled down. However, merely for purposes of description, conveyor 102 includes supports 122 which raise conveyor 102 from a first end to a second end which is raised higher than the first end. Rocks of a first size 120 are carried by conveyor into hopper 126 which feeds a rock crusher 128. Rock crusher 128 may also operate by receiving electrical power and using a variety of mill wheels, grinding wheels, hammers, or other devices to break rocks of a first size 120 into rocks 144 of a second size, smaller than rocks of a first size 120.

Generator 132 may be similar to generator 108, discussed above, and generate electricity by converting chemical fuel into electricity by, for example, a diesel motor stored in compartment 134. Generator 132 may provide an emergency shutoff button 136 and may include one or more interface elements 138 which allow a user to control various functionalities of the generator. Generator 132 may include an interface device 140 which may retrieve generator operation information from generator 132 and a transmitter device 142 which transmits the generator operation information from generator 132 to a remote generator controller device, which will be discussed below.

Interface device 140 may be connected to generator 132 using any suitable connection. Interface device 140 may obtain generator operation information from generator 132 that includes information such as operational status (on/off), engine hours, average rotations per minute of a motor, current rotations per minute of a motor, electrical output frequency, generator load, average output voltage, fuel pressure, fuel storage level, coolant temperature, oil pressure, oil level, battery voltage, current output, motor temperature, airflow, and any other information that may be relevant to operation of generator 132. Interface device 140 may provide the generator operation information to transmitter device 142 which may transmit the generator operation information from generator 132 to a remote generator device, as will be discussed below.

Rock crusher 128 receives electricity generated by generator 132, via electrical connection 130, and mills, grinds, or breaks rocks of a first size 120 into rocks of a second size 144, smaller than rocks of a first size 120. Rocks of a second size 144 may be disposed onto a conveyor belt 150 which includes a conveyor control device 146 which may be used to control various functionality of conveyor 150. Conveyor 150 may carry rocks of a second size 144 up conveyor 150 by successively higher supports 148, although supports 148 need not be successively higher and may simply be equal in height or may be implemented as successively lower supports 148. However, for purposes of description in FIG. 1, conveyor belt 150 is shown as including successively higher supports 150 to carry rocks of a second size out of rock crusher 128.

As before with conveyor 102, conveyor 150 requires electrical power to operate. Thus, conveyor 150 is connected to generator 154 by electrical connection 152. Generator 154 may be similar to generator 108 and generator 132, discussed above, and generate electricity by converting chemical fuel into electricity by, for example, a diesel motor stored in compartment 156. Generator 154 may provide an emergency shutoff button 158 and may include one or more interface elements 160 which allow a user to control various functionalities of the generator. Generator 154 may include an interface device 162 which may retrieve generator operation information from generator 154 and a transmitter device 164 which transmits the generator operation information from generator 154 to a remote generator controller device, which will be discussed below.

Interface device 162 may be connected to generator 154 using any suitable connection. Interface device 162 may obtain generator operation information from generator 154 that includes information such as operational status (on/off), engine hours, average rotations per minute of a motor, current rotations per minute of a motor, electrical output frequency, generator load, average output voltage, fuel pressure, fuel storage level, coolant temperature, oil pressure, oil level, battery voltage, current output, motor temperature, airflow, and any other information that may be relevant to operation of generator 154. Interface device 162 may provide the generator operation information to transmitter device 164 which may transmit the generator operation information from generator 154 to a remote generator controller device, as will be discussed below.

Conveyor belt 150 may move rocks of a second size 144 into a hopper 166 that may feed a second rock crusher, another conveyor belt or another device as necessary to create cement in the cement plant. FIG. 1 illustrates three consecutive dots which identify that further devices may be implemented as necessary. Further, various different sites performing various different activities may have different mechanical and electrical needs. Mines, logging sites, farms, ranches, and other locations may require the use of different electrically operated equipment that is generated by one or more generators. FIG. 1 merely illustrates a simple example of a cement plant for explanatory purposes.

The cement plant illustrated in FIG. 1, or any other similar sites, may provide a control center 168 which allows a user to monitor the progress of material through, for example, conveyor belt 102, rock crusher 128, and conveyor belt 150. In many situations, controls for conveyor belt 102, rock crusher 128, and conveyor belt 150 may be connected to a remote controller, such as controller 176, controller 178, and controller 180, by wire 170, wire 172, and wire 174. Remote controller 176 may, for example, be connected to conveyor control device 106 by wire 170 and allow a user to adjust a speed, turn conveyor 150 on/off, or include an emergency stop. Remote controller 178 may, for example, be connected to rock crusher 128 by wire 172 and allow a user to turn rock crusher 128 on/off or include an emergency stop. Remote controller 180 may, for example, be connected to conveyor control device 146 by wire 174 and allow a user to adjust a speed, turn conveyor 150 on/off, or include an emergency stop.

Generator 108, generator 132, and generator 154 may connect by wireless connection 188, wireless connection 190, and wireless connection 192 to remote generator controller device 182. Remote generator controller device 182 may include controller/receiver 184 (which will be discussed in more detail below) and receive generator operation information from transmitter device 118, transmitter device 142, and transmitter device 164 of generator 108, generator 132, and generator 154, respectively. Generator operation information received by remote generator controller device 182 may be provided to a user via remote generator controller device 182. Remote generator controller device 182 may include a power input 186 to provide power for operation of remote generator controller device 182. It should be noted that remote generator controller device 182 may be located in any convenient location. For example, remote generator controller device 154 may be located in a front-end loader (or any other piece of equipment) which is loading material into a hopper, such as hopper 104, to allow an operator of the front end loader to monitor the operational condition of one or more generators (such as generator 108, generator 132, and generator 154) while loading material into hopper 104.

As will be further discussed below, remote generator controller device 182 may detect problems in generator 108, generator 132, and generator 154 before a generator is forced to shut down by, for example, a current limiter circuit, and manually stop other parts of the system such that material does not jam conveyor belt 102, rock crusher 128, and conveyor belt 150, for example.

In one exemplary circumstance, for purposes of illustration and description only, remote generator controller device 182 may detect an excess current draw in generator 132 and immediately shut down conveyor belt 102, rock crusher 128, and conveyor belt 150 to identify the cause of the excess current draw. Upon examination, for example, a user may determine that a broken iron tool became lodged between milling wheels, causing rock crusher 128 to draw additional current from generator 132 in an attempt to continue spinning milling wheels. However, since the user was able to shut down conveyor belt 102, rock crusher 128, and conveyor belt 150, none of hopper 104, hopper 126, or hopper 166 became jammed with excess material. Thus, once the broken tool is removed from rock crusher 128, conveyor belt 102, rock crusher 128, and conveyor belt 150 may be restarted without significant downtime for the cement plant. If hopper 104, hopper 126, or hopper 166 became jammed by material, such as rocks or dirt, a substantial amount of manual labor and time may be required to dislodge the jam.

A costly delay in concrete production may be so avoided because early information that a problem existed in generator 132 was identified before the problem could cause generator 132 to automatically shut down.

Figure 2:
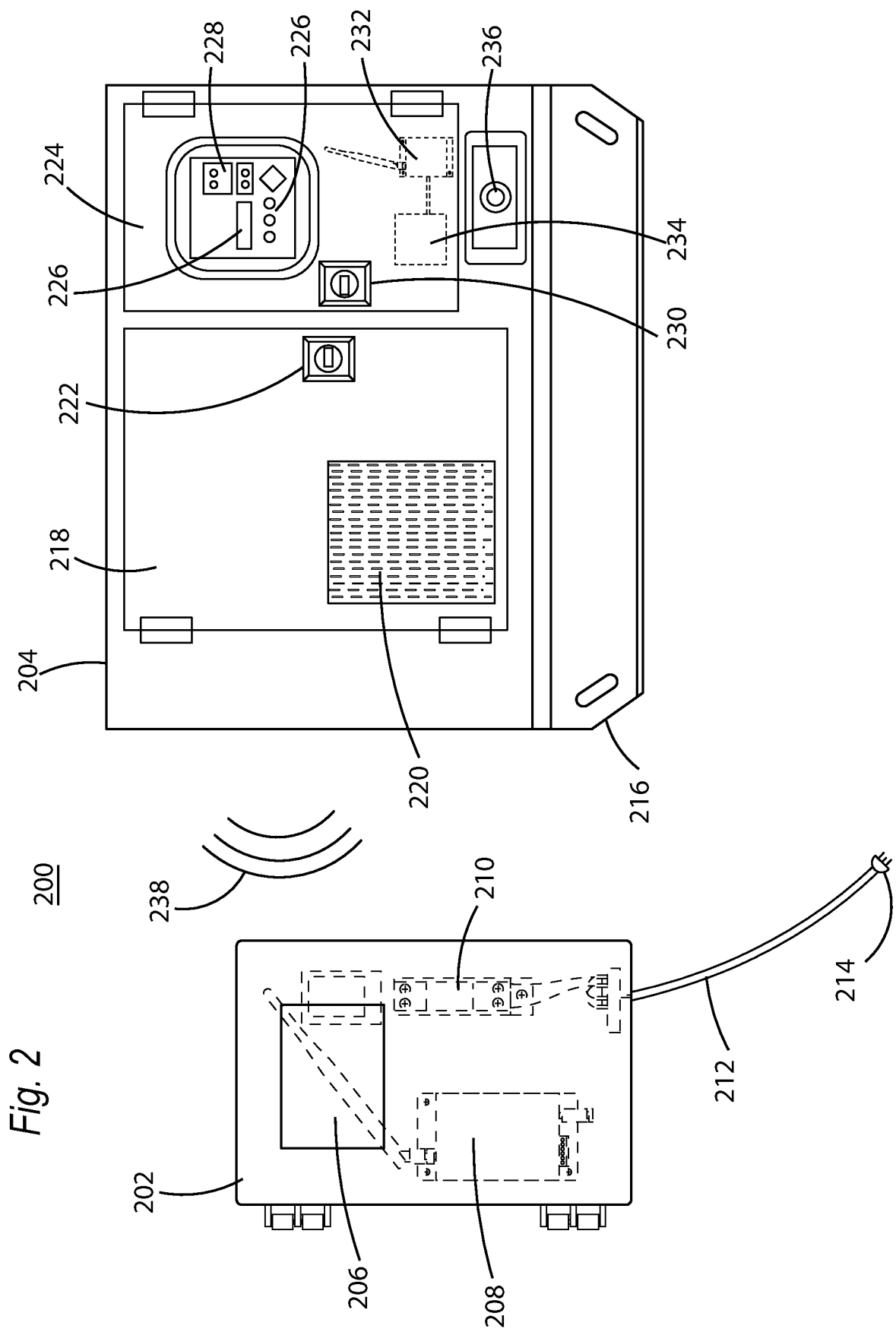
FIG. 2 illustrates an exemplary system level implementation of a remote generator dashboard system.

FIG. 2 illustrates an exemplary system level implementation of a remote generator dashboard system 200. Remote generator dashboard system 200 includes a generator controller device 202 which interfaces with generator 204. Generator controller device 202 may include a screen 206 which may provide generator operation information to a user and allow the user to interact with generator controller device 202. Remote generator controller device 202 may further include a receiver/transmitter 208 to receive and transmit information from remote generator controller device 202 to generator 204, as will be described below. Remote generator controller device 202 may further include one or more electrical components 210 to regulate input voltage and input current received through wire 212 and 120V (or 240V) AC plug 214. Electrical components 210 may be implemented as necessary to receive power using standard input power available in different countries (e.g. 120V or 240V power). While remote generator controller device 202 is shown in FIG. 2 as receiving AC power, remote generator controller device 202 may be battery powered, using appropriate batteries.

Generator 204 includes a base 216 which may be implemented in a manner that allows generator 204 to be dragged from one position to another. For example, various connection points may be installed in base 216 which may be chained to, for example, an excavator, a front end loader, a bull dozer, a truck, or other vehicle to drag generator 204 from one location to another. Generator 204 may include an access door 218 which provides access to an internal motor, a fuel storage, and other components of generator 204. Access door 218 may include vents 220 to allow fresh air to be drawn into generator 204. Access door 218 may further include a latch 222 which may secure access door 218 in a closed position or which may release to allow a user to open access door 218. Generator 204 may further include a controller door 224 which provides access to various generator controls. Controller door 224 may include an opening to provide interface elements 226 for providing a user with control over generator 204. Interface elements 226 may include a screen, screen interface buttons and a keyhole 228 for receiving a key in a key switch to start and stop generator 204. Alternatively, interface elements, such as screen 226 may be provided only by opening controller door 224 via latch 230.

Regardless, disposed within controller door 224 of generator 204, are a generator interface device 234 and a receiver/transmitter 232. Generator interface device 234 may connect to one or more information ports (not shown in FIG. 2) provided by generator 204 or generator sensors (not shown in FIG. 2) to receive generator operation information from generator 204. As before, generator operation information may include information such as operational status (on/off), engine hours, average rotations per minute of a motor, current rotations per minute of a motor, electrical output frequency, generator load, average output voltage, fuel pressure, fuel storage level, coolant temperature, oil pressure, oil level, battery voltage, current output, motor temperature, airflow, and any other information that may be relevant to operation of generator 204. Generator operation information may be transmitted via transmitter/receiver 232 to generator controller device 202 to be provided to a user at a remote location via screen 206. Generator 204 may further include an emergency shut down button 236.

Generator interface device 234 and transmitter/receiver 232 may include hardware components may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. Generator interface device 234 and transmitter/receiver 232 may also include software and hardware modules, sequences of instructions, routines, data structures, display interfaces, and other types of structures that execute interface operations. In one embodiment, transmitter/receiver 232 may transmit and receive information by a wireless connection 238 established between transmitter/receiver 232 in generator 204 and transmitter/receiver 208 in remote generator controller 202. In one embodiment, transmitter/receiver 232 in generator 204 and transmitter/receiver 208 in remote generator controller 202 may have a wireless communication range of approximately 4 miles (approximately 6.4 km). Transmitter/receiver 232 in generator 204 and transmitter/receiver 208 in remote generator controller 202 may communicate using radio frequency communication. However, any suitable communication connection may be implemented including any wired, wireless, cellular based, or internet based connections. Examples of these various communication connections include internet based communication protocols Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between transmitter/receiver 232 in generator 204 and transmitter/receiver 208 in remote generator control device 202 or vice versa.

In one example, generator interface device 234 may detect a fault in generator 204 which may be transmitted to remote generator control device 202 for display on screen 206. In response, a user may interact with screen 206 to send an emergency stop command to generator 204 via transmitter/receiver 208 in remote generator control device 202 to transmitter/receiver 232 in generator 204. Transmitter/receiver 232 in generator 204 may provide the emergency stop command to generator 204 via generator interface device 234 which causes generator 204 to shut down virtually instantaneously. A technician may then review generator operation information provided to remote generator control device 202 and inspect generator 204, or associated devices, to determine the cause of the fault.

Figure 3:
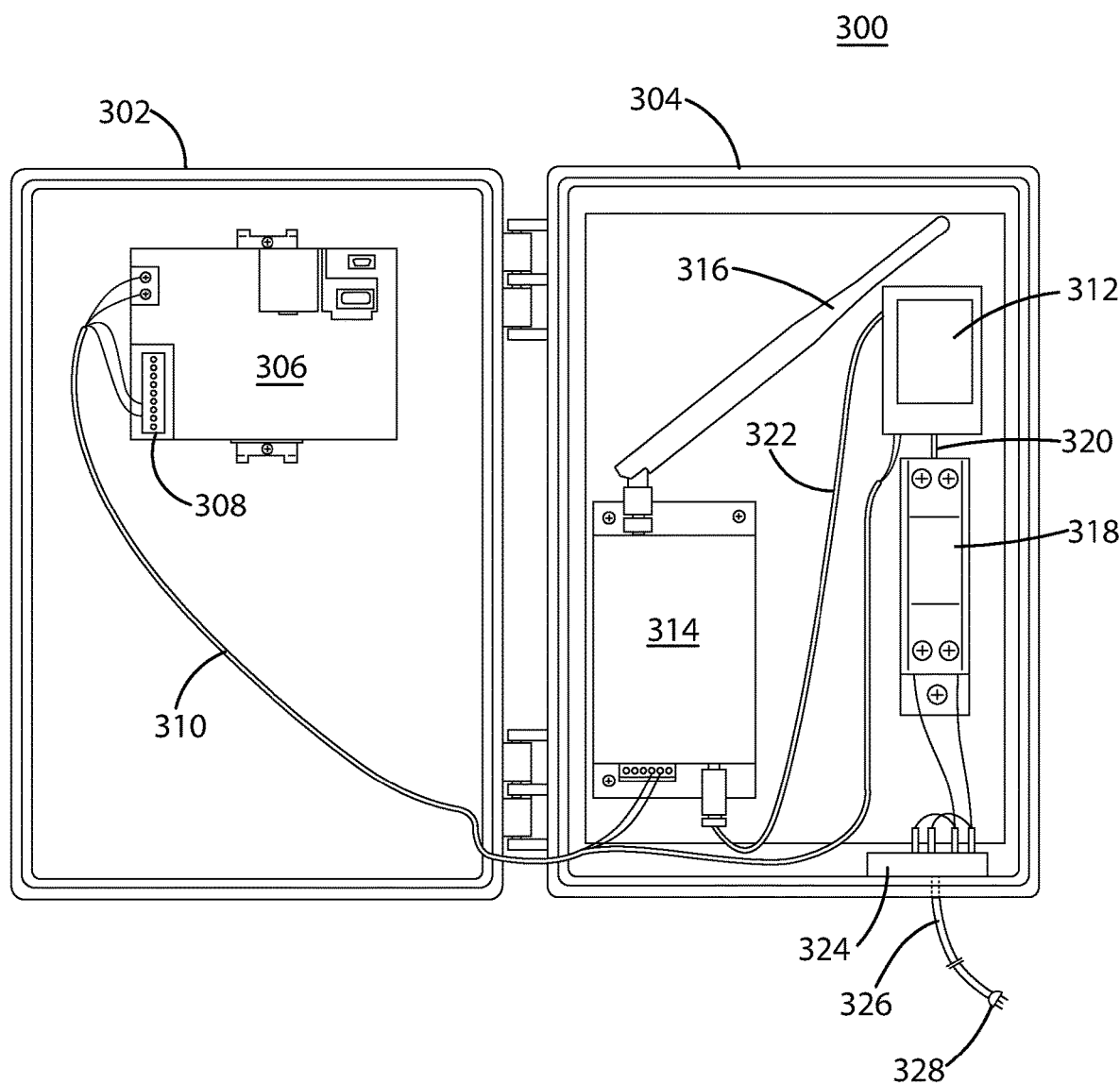
FIG. 3 illustrates various elements of a control device and receiver transmitter/device associated with the remote generator dashboard system.

FIG. 3 illustrates various elements of a control device 306 and transmitter/receiver device 314 associated with the remote generator controller device 300 of a remote generator dashboard system, such as remote generator dashboard system 200, shown in FIG. 2. Remote generator controller device 300 may be implemented as a hinged box which may have a top portion 302 and a bottom portion 304. Top portion 302 may include a controller 306. Controller 306 may include power connectors and information connectors 308 in addition to other connectors for interfacing with a screen (not shown in FIG. 3). Controller 306 may include hardware components may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. In addition, controller 306 may provide a screen accessible to a user. Wire 310 may connect controller 306 to both power and information from bottom portion 304, as will be described below.

Bottom portion 304 may include transmitter/receiver device 314 which may communicate with other devices, which will be shown and described below with respect to FIG. 4, transmitter/receiver device 314 may transmit received information to controller 306 via wire 310. Further, transmitter/receiver device 314 may receive power in appropriate voltages through power regulator 318. Power regulator 318 may receive AC (alternating current) electricity via a power port 324 which connects to wire 326 and receives AC electricity via plug 328. Power regulator 318 may be implemented as a circuit breaker device, a fuse, a power supply, or any other device known in the art. Further, while power regulator 318 is illustrated in FIG. 3 as being connected by wire 320 to rectifier/DC voltage regulator 312, rectifier/DC voltage regulator 312 and power regulator 312 may be implemented together in a single housing of electrical components. Power regulator 318 may receive AC electricity and ensure that a current input is below an acceptable threshold for rectifier/DC voltage regulator 312. Power regulator 318 may then provide electricity to rectifier/DC voltage regulator 312 which may be converted from AC electricity to DC (direct current) electricity and regulated to an appropriate voltage level to operate controller 306 and transmitter/receiver 314.

It should be noted that remote generator controller device 300 may be implemented with a battery back up in case AC electricity supplied to remote generator controller device 300 fails. Further, remote generator controller device 300 may, via transmitter/receiver 314, interface with one or a plurality of generators simultaneously, or virtually simultaneously (as shown in FIG. 1). In other words, remote generator controller device 300 may receive generator operation information from each generator in intervals of less than 10 seconds, for example, such that a change in generator operation information can be immediately detected and reported to a user. Transmitter/receiver 314 may further include an antenna 316 which may extend a wireless communication range for transmitter/receiver 314 to approximately 4 miles (6.5 km). In another embodiment, a remote generator controller device 300 may be provided for an individual generator individually using a serialized connection to ensure that only the remote generator controller device 300 may be used with remote generator controller device 300. Wire 322 may receive power from rectifier/DC voltage regulator 312 and provide DC electricity to transmitter/receiver 314.

Figure 4:
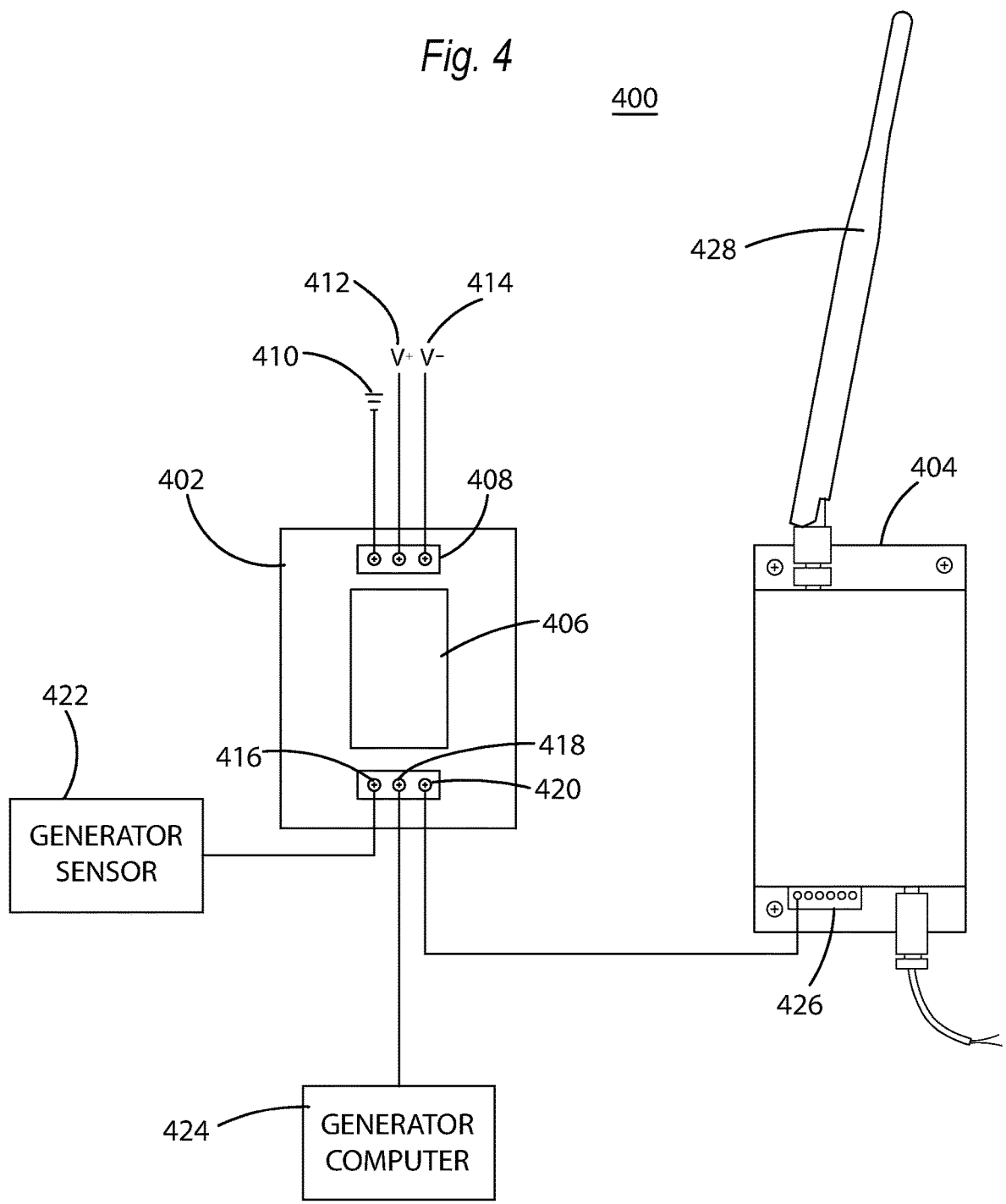
FIG. 4 illustrates various elements of a generator interface device and information transmitter device.

FIG. 4 illustrates various elements of an interface 400 which includes a generator interface device 402 and information transmitter/receiver device 404. Generator interface device 402 may include a processor 406 and implement a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art.

Generator interface device 402 may further include a power connector 408 which may receive electrical power in a variety of ways. As shown in FIG. 4, power connector 408 implements ground connection 410, a positive voltage connection 412, and a negative voltage connection 414 to receive power in a DC electrical environment. However, a variety of implementations are possible in both a DC electrical environment and an AC electrical environment. Electrical power supplied to connector 408 may be derived from a battery in a generator or may be obtained through an interface connection with the generator.

Generator interface device 402 may further include a generator sensor information connector 416, a generator computer information connector 418, and an information connector 420 for sending information to transmitter/receiver device 426. Information connector 416 may receive generator sensor information from a generator sensor 422 which may be provided to processor 406. Generator sensor information may be any information that is obtained from a sensor in a generator. For example, an over current sensor, a battery voltage sensor, or other sensor in a generator may directly interface with generator interface device 402.

Information connector 418 may receive information from a generator computer 424 which may be provided to processor 406. Generator computer 424 may provide real time generator operation information to processor 406. Generator computer 424 may be a computer which controls the operation of a generator. Generator interface device 402 may receive the information from generator sensor 422 and/or generator computer 424 and provide generator operation information (which includes generator sensor information) to transmitter/receiver 404 via a wire disposed between information connector 420 and connector 426 on transmitter/receiver 404.

Transmitter/receiver 404 may include a hardware for transmitting and receiving information wirelessly using any of the information communication and transmission protocols discussed above. Transmitter/receiver 404 receives generator operation information from generator interface device 402 and wirelessly transmits the information to a remote generator controller device, such as remote generator controller device 300, shown in FIG. 3.

Transmitter/receiver 404 may further include an antenna 428 which may extend a wireless communication range for transmitter/receiver 404 to approximately 4 miles (6.5 km).

Figure 5:
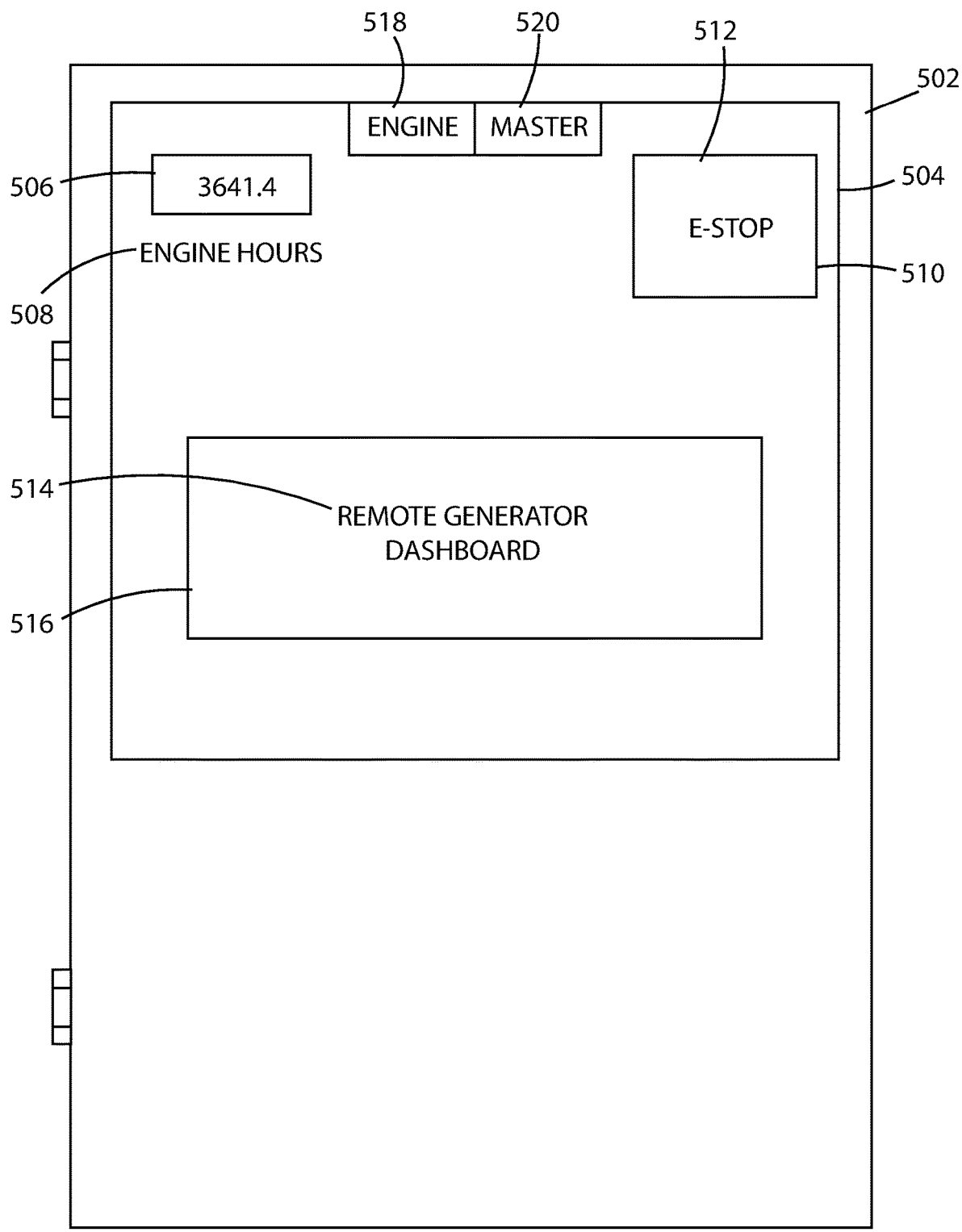
FIG. 5 illustrates an exemplary user interface for the control device.

FIG. 5 illustrates an exemplary user interface 500 for the remote generator controller device 502 which may be similar in implementation and description to other remote generator controller devices disclosed herein. As shown in FIG. 5, a remote generator controller device 502 provides a screen 504. Screen 504 may be implemented as a touch screen or another type of screen that uses a tactile element (e.g., a touch pad) or peripheral device (e.g., a mouse) to interface with a user.

User interface 500 includes an engine hours icon 506 and an identifier 508 of "engine hours" to display to a user that a generator, for example, has operated for 3641.4 hours. Additionally, user interface 500 may include button elements 510 which provide a user with an ability to provide input into remote generator controller device 502. Button element 510 may implement an emergency stop 512 which, when pressed, may send a command to a generator interface device, such as generator interface device 402, shown in FIG. 4, to shut down immediately. User interface 500 may further include information elements, such as information element 514 which provide information to a user about a generator or information currently displayed on a screen. As shown in FIG. 5, information element 514 provides information 516 that the screen being shown is a "remote generator dashboard." Information element 514 may begin to flash, emit sounds, or otherwise notify a user when generator operation information changes in a manner that indicates a potential problem may arise.

User interface 500 may further allow a user to select other user interfaces that the user wishes to access. For example, user interface button 518, when interacted with, may cause remote generator controller device 500 to update graphical user interface 500 with another graphical user interface, such as those that will be discussed below, or others. Button 518 may provide engine information about a generator in a new user interface. Similarly, user interface button 520, when interacted with, may cause remote generator controller device 500 to update graphical user interface 500 with a second graphical user interface. User interface button 520, may provide master information about different generators in the system or provide master control over a particular generator, for example.

Figure 6:
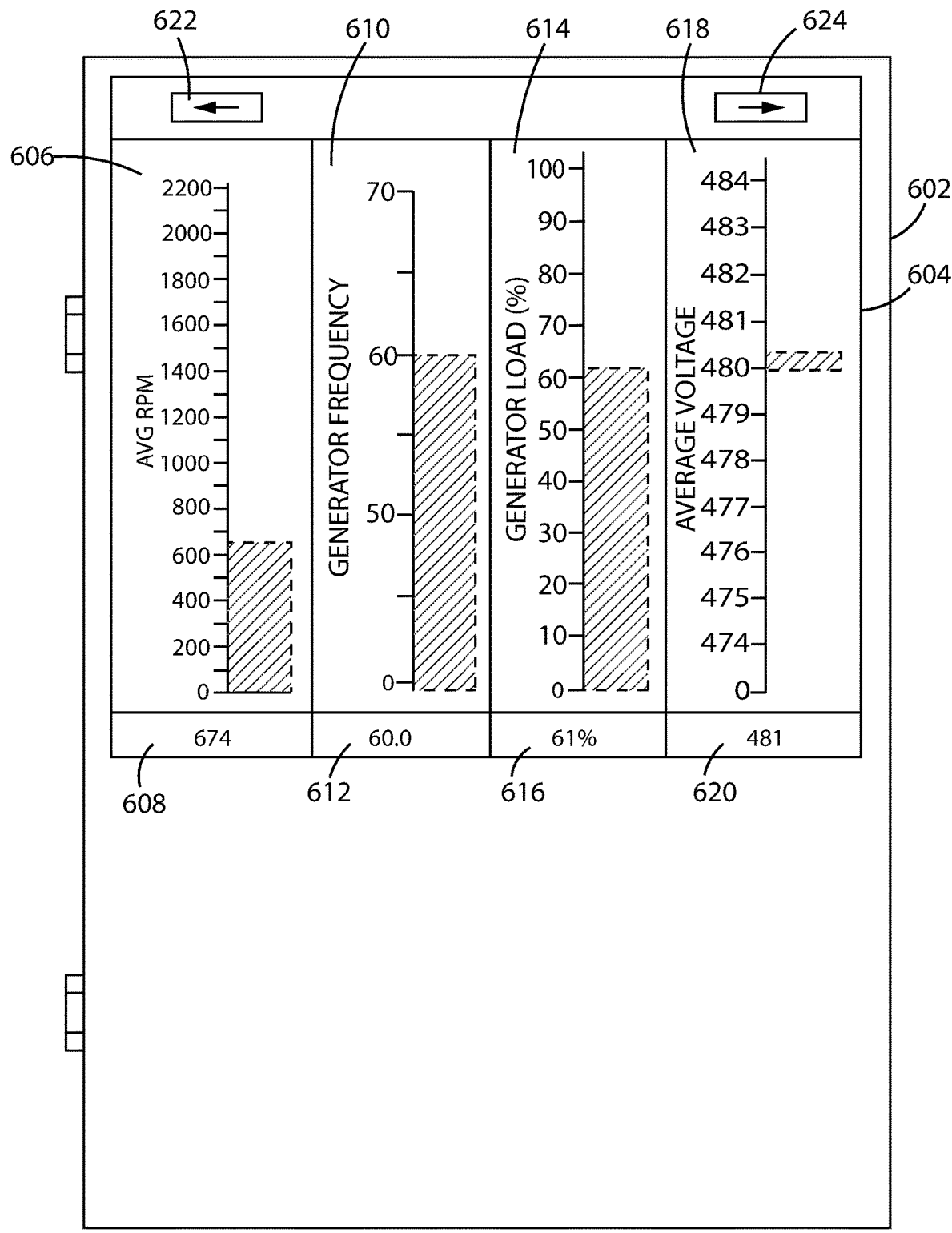
FIG. 6 illustrates a second exemplary user interface for the control device.

FIG. 6 illustrates a second exemplary user interface 600 for the remote generator controller device 602. Remote generator controller device 602 may be similar in implementation and description to other remote generator controller devices disclosed herein and provide a screen 604. Screen 604 may be implemented as a touch screen or another type of screen that uses a tactile element (e.g., a touch pad) or peripheral device (e.g., a mouse) to interface with a user.

User interface 600 may provide a number of generator electrical information elements such as generator information element 606. Generator information element 606 provides information related to an average number of rotations per minute for a generator in a bar graph style information graph. Generator information element 608 provides numerical information for a generator's current average number of rotations per minute. Generator information element 610 provides information related to a frequency of electrical output for a generator in a bar graph style information graph. Generator information element 612 provides numerical information for a generator's current frequency of electrical output for the generator. Generator information element 614 provides information related to a percentage of generator electrical load that may be output by a generator in a bar graph style information graph. Generator information element 616 provides numerical information for a generator's current electrical load. Finally, generator information element 618 provides information related to an average voltage output by the generator in a bar graph style information graph. Generator information element 620 provides numerical information for a generator's average voltage output. In one embodiment, one or more of information elements 606-620 may flash or change colors to indicate to a user that a certain electrical characteristic or generator output condition may have the potential to cause a problem or indicate a fault in the generator.

User interface 600 may further provide navigation elements, such as navigation element 622 and navigation element 624 which allow a user to scroll through different user interfaces to obtain the desired information.

Figure 7:
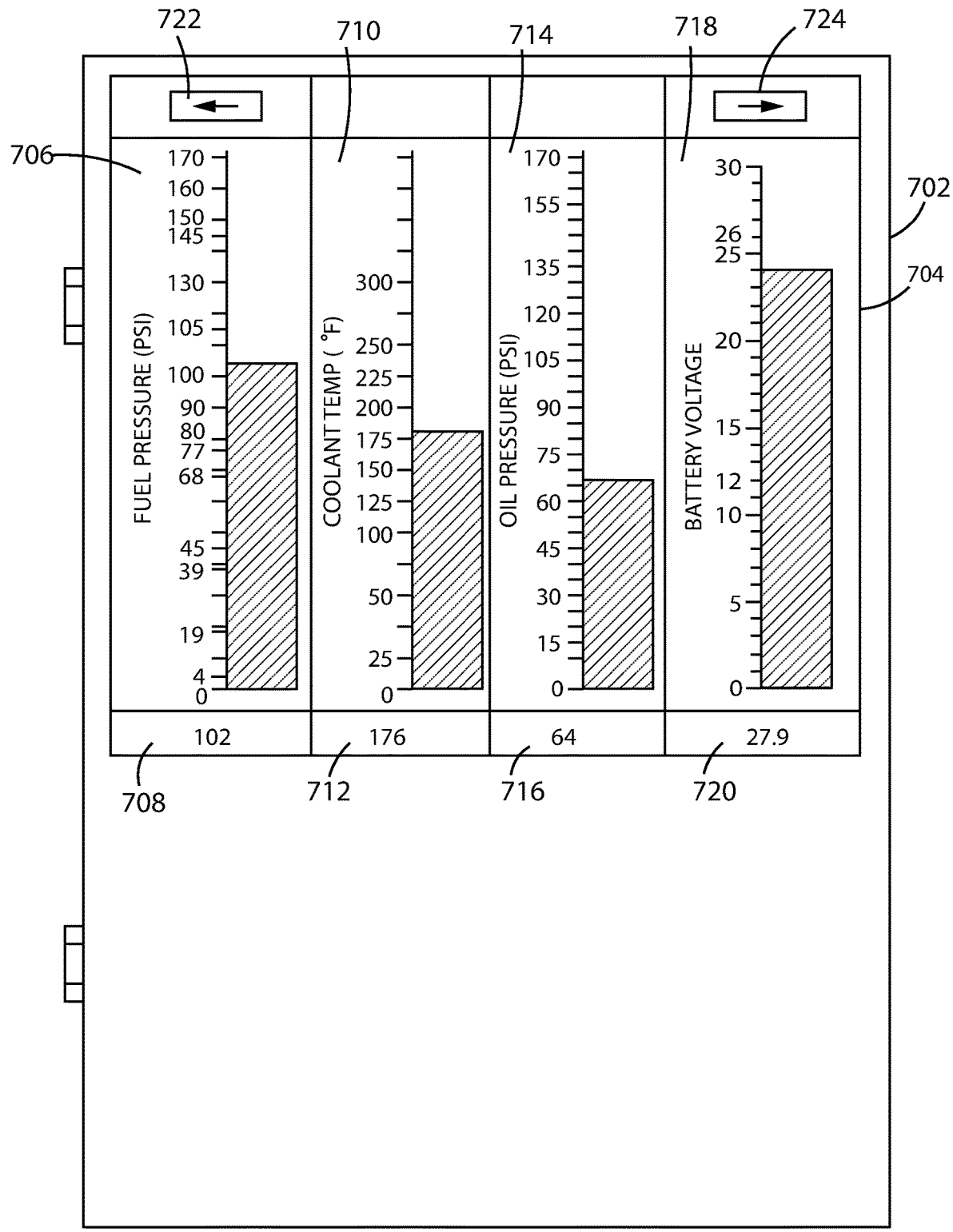
FIG. 7 illustrates a third exemplary user interface for the control device.

FIG. 7 illustrates a third exemplary user interface 700 for remote generator controller device 702. Remote generator controller device 702 may be similar in implementation and description to other remote generator controller devices disclosed herein and provide a screen 704. Screen 704 may be implemented as a touch screen or another type of screen that uses a tactile element (e.g., a touch pad) or peripheral device (e.g., a mouse) to interface with a user.

User interface 700 may provide a number of generator motor information elements such as generator information element 706. Generator information element 706 provides information related to a fuel pressure in a bar graph style information graph. Generator information element 708 provides numerical information for a fuel pressure. Generator information element 710 provides information related to a coolant temperature for a motor in a generator in a bar graph style information graph. Generator information element 712 provides numerical information for a coolant temperature for a motor in a generator for the generator. Generator information element 714 provides information related to an oil pressure in a motor of a generator in a bar graph style information graph. Generator information element 716 provides numerical information for an oil pressure in a motor of a generator. Finally, generator information element 718 provides information related to a battery voltage for a generator in a bar graph style information graph. Generator information element 720 provides numerical information for a battery voltage for a generator. In one embodiment, one or more of information elements 706-720 may flash or change colors to indicate to a user that a certain electrical characteristic or generator output condition may have the potential to cause a problem or indicate a fault in the generator.

User interface 700 may further provide navigation elements, such as navigation element 722 and navigation element 724 which allow a user to scroll through different user interfaces to obtain the desired information.

Figure 8:
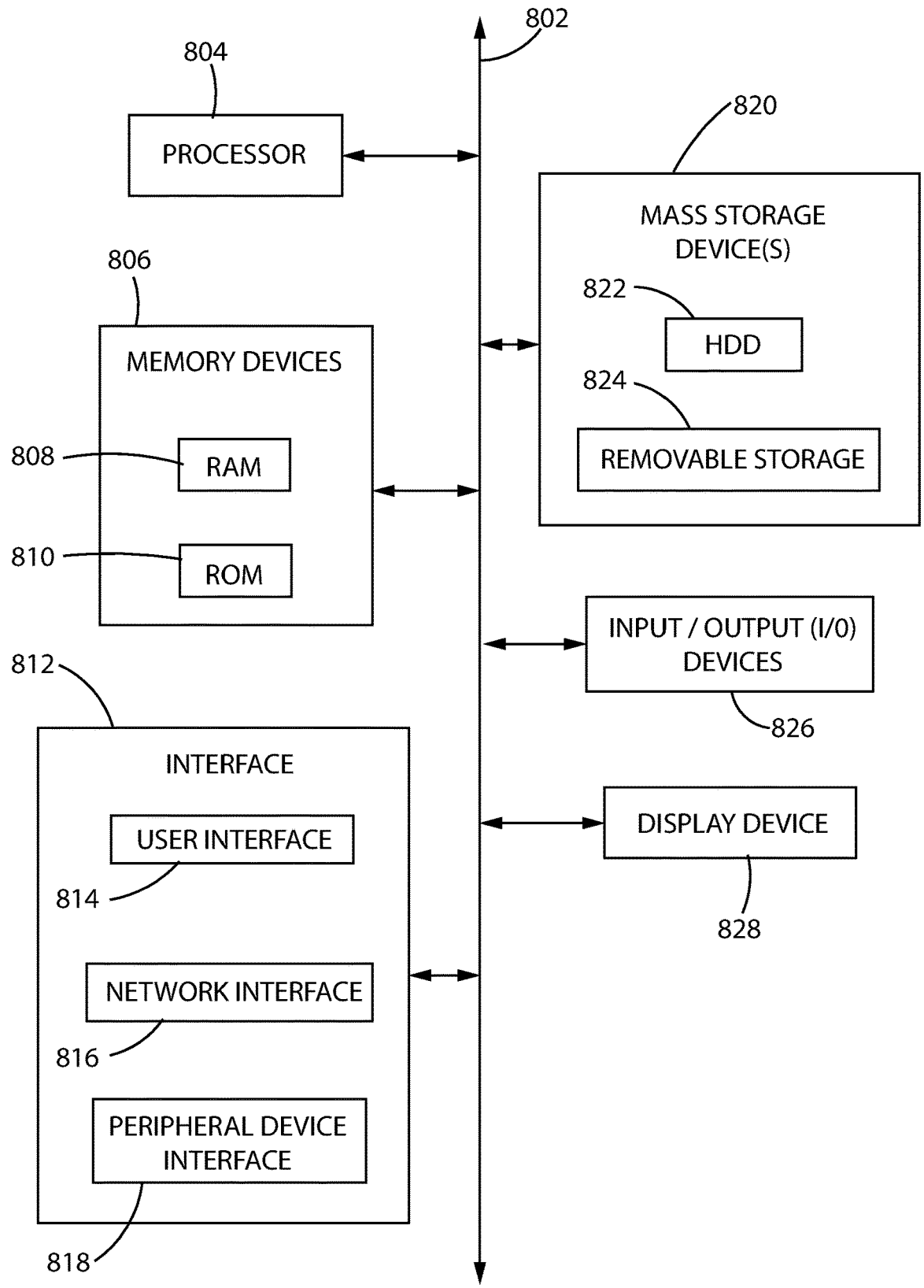
FIG. 8 illustrates various hardware elements of the control device.

FIG. 8 illustrates various hardware elements of the remote generator controller device 800, such as those remote generator controller devices disclosed herein. Remote generator controller device 800 may include or utilize a special purpose or general-purpose computer, including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. In an implementation, a remote generator controller device and a generator interface device may be networked in order to communicate with each other, and other components, connected over the network to which they are connected. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code in the form of computer-executable instructions or data structures that can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the remote generator controller device may be implemented in many types of computing environments with many types of computer system configurations, including, personal computers, desktop computers, laptop computers, message processors, control units, camera control units, hand-held devices, hand pieces, multi-processor systems, microprocessor-based or programmable consumer electronics, network PCs, mini-computers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

FIG. 8 is a block diagram illustrating a remote generator controller device 800. Remote generator controller device 800 may be used to perform various procedures, such as those discussed herein. Remote generator controller device 800 may function as a server, a client, or any other computing entity. Remote generator controller device 800 can perform various monitoring functions as discussed herein, and can execute one or more application programs, such as the application programs described herein. Remote generator controller device 800 can be any of a wide variety of computing devices, such as a desktop computer, a notebook computer, a server computer, a handheld computer, tablet computer and the like.

Remote generator controller device 800 includes one or more processor(s) 804, one or more memory device(s) 806, one or more interface(s) 812, one or more mass storage device(s) 820, one or more Input/Output (I/O) device(s) 826, and a display device 828 all of which are coupled to a bus 802. Processor(s) 804 include one or more processors or controllers that execute instructions stored in memory device(s) 806 and/or mass storage device(s) 820. Processor(s) 804 may also include various types of computer-readable media, such as cache memory.

Memory device(s) 806 include various computer-readable media, such as volatile memory (e.g., random access memory (RAM) 808) and/or nonvolatile memory (e.g., read-only memory (ROM) 810). Memory device(s) 806 may also include rewritable ROM, such as Flash memory.

Mass storage device(s) 820 include various computer readable media, such as magnetic tapes, magnetic disks, optical disks, solid-state memory (e.g., Flash memory), and so forth. Remote generator controller device 800 may include a hard disk drive 822. Various drives may also be included in mass storage device(s) 820 to enable reading from and/or writing to the various computer readable media. Mass storage device(s) 820 include removable media 824 and/or non-removable media.

I/O device(s) 826 include various devices that allow data and/or other information to be input to or retrieved from remote generator controller device 800. Example I/O device(s) 826 include digital imaging devices, electromagnetic sensors and emitters, cursor control devices, keyboards, keypads, microphones, monitors or other display devices, speakers, printers, network interface cards, modems, lenses, CCDs or other image capture devices, and the like.

Display device 828 includes any type of device capable of displaying information to one or more users of remote generator controller device 800. Examples of display device 828 include a screen, a touch screen, a monitor, a display terminal, a video projection device, and the like.

Interface(s) 812 include various interfaces that allow remote generator controller device 800 to interact with other systems, devices, or computing environments. Example interface(s) 812 may include user interface elements 814. Other exemplary interface(s) may include any number of different network interfaces 816, such as interfaces to local area networks (LANs), wide area networks (WANs), wireless networks, and the Internet. Other interface(s) include a peripheral device interface 818. The interface(s) 812 may also include one or more peripheral interfaces such as interfaces for printers, pointing devices (mice, track pad, etc.), keyboards, and the like.

Bus 802 allows processor(s) 804, memory device(s) 806, interface(s) 812, mass storage device(s) 820, and I/O device(s) 826 to communicate with one another, as well as other devices or components coupled to bus 802. Bus 802 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of remote generator controller device 800, and are executed by processor(s) 804. Alternatively, the systems and procedures described herein can be implemented in hardware, or a combination of hardware, software, and/or firmware. For example, one or more application specific integrated circuits (ASICs) or field programmable gate arrays (FPGAs) can be programmed to carry out one or more of the systems and procedures described herein.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A system comprising:
    a remote generator interface controller, and
    a generator interface device,
    wherein the generator interface device receives generator operation information and transmits the generator operation information to the remote generator interface controller.

2. The system of claim 1, wherein the remote generator interface controller includes a screen that displays the generator operation information.

3. The system of claim 2, wherein the remote generator interface controller provides one or more interface buttons on the screen.

4. The system of claim 3, wherein the one or more interface buttons on the screen include an emergency generator stop button.

5. The system of claim 4, wherein in response to receiving an indication of interaction with the emergency generator stop button, the remote generator interface controller transmits a generator shut down command to the generator interface device.

6. The system of claim 1, wherein the remote generator controller device includes one or more electrical components to receive alternating current electricity and generate direct current electricity.

7. The system of claim 1, wherein the generator interface device receives information from a generator sensor.

8. The system of claim 1, wherein the generator interface device receives information from a generator computer.

9. The system of claim 1, wherein the generator interface device is connected to a generator.

10. The system of claim 9, wherein the generator interface device is housed within a generator.

11. The system of claim 10, wherein the remote generator controller device is remote from the generator.

12. The system of claim 1, wherein the remote generator controller device receives the generator operation information wirelessly.

13. A remote generator controller device, comprising:
    a processor;
    a screen;
    a wireless receiver connected wirelessly to receive generator operation information from a generator interface device connected to a generator.

14. The remote generator controller device of claim 13, further comprising a wireless transmitter connected wirelessly to transmit control information to a generator interface device connected to a generator.

15. The remote generator controller device of claim 13, further comprising a rectifier.

16. The remote generator controller device of claim 13, further comprising a battery.

17. A generator interface device, comprising:
    a processor connected to a generator which receives generator operation information from at least one of a generator computer and a generator sensor and
    a transmitter connected wirelessly to transmit the generator operation information wirelessly from the generator interface device to a remote generator controller device.

18. The generator interface device of claim 17, further comprising a receiver connected wirelessly to receive control information from the remote generator controller device.

19. The generator interface device of claim 17, wherein generator operation information includes one or more of engine hours information, average rotations per minute information, generator frequency information, generator load information, average voltage output information, fuel pressure information, coolant temperature information, oil pressure information, and battery information.

20. The generator interface device of claim 17, further comprising one or more power connectors which are connected to a generator battery.

* * * * *